United States Patent
Sohn

(10) Patent No.: US 11,277,194 B2
(45) Date of Patent: Mar. 15, 2022

(54) METHOD AND APPARATUS FOR MANAGING RADIO RESOURCES IN WIRELESS BACKHAUL SYSTEM

(71) Applicant: Electronics and Telecommunications Research Institute, Daejeon (KR)

(72) Inventor: Kyung Yeol Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 39 days.

(21) Appl. No.: 17/009,254

(22) Filed: Sep. 1, 2020

(65) Prior Publication Data

US 2021/0075493 A1 Mar. 11, 2021

(30) Foreign Application Priority Data

Sep. 10, 2019 (KR) .................. 10-2019-0112250

(51) Int. Cl.
*H04W 24/10* (2009.01)
*H04B 7/10* (2017.01)
*H04W 72/04* (2009.01)
*H04W 88/14* (2009.01)

(52) U.S. Cl.
CPC .............. *H04B 7/10* (2013.01); *H04W 24/10* (2013.01); *H04W 72/0453* (2013.01); *H04W 88/14* (2013.01)

(58) Field of Classification Search
CPC ...... H04B 7/10; H04B 7/0413; H04B 7/0469; H04B 7/0602; H04B 7/2612; H04B 17/382; H04W 24/10; H04W 72/0453; H04W 88/14; H04W 16/02; H04L 27/2601
See application file for complete search history.

(56) References Cited

U.S. PATENT DOCUMENTS

| | | | |
|---|---|---|---|
| 2014/0362959 A1* | 12/2014 | Yom | H04B 7/0885 375/349 |
| 2015/0201403 A1 | 7/2015 | Seo et al. | |
| 2015/0381282 A1 | 12/2015 | Zhang et al. | |
| 2016/0219584 A1 | 7/2016 | Bertrand et al. | |
| 2016/0365900 A1 | 12/2016 | Kim et al. | |
| 2017/0164213 A1 | 6/2017 | Lim et al. | |
| 2018/0063693 A1 | 3/2018 | Chakraborty et al. | |
| 2018/0198539 A1* | 7/2018 | Kim | H04B 17/336 |

FOREIGN PATENT DOCUMENTS

WO 2018017920 A1 1/2018

* cited by examiner

*Primary Examiner* — Chuong A Ngo
(74) *Attorney, Agent, or Firm* — William Park & Associates Ltd.

(57) ABSTRACT

An operation method of a first node belonging to an Xhaul network in a wireless backhaul system including the Xhaul network may comprise transmitting first resource allocation information to a second node and third nodes; receiving, from the second node, information of cross polarization interferences (XPIs) measured for wireless signals through wireless links generated based on the first resource allocation information; generating second resource allocation information indicating resources allocated to each of the second node and the third nodes based on the information of the XPIs; and transmitting the second resource allocation information to the second node and the third nodes, wherein the XPIs for the wireless signals are measured by the third nodes.

20 Claims, 15 Drawing Sheets

100

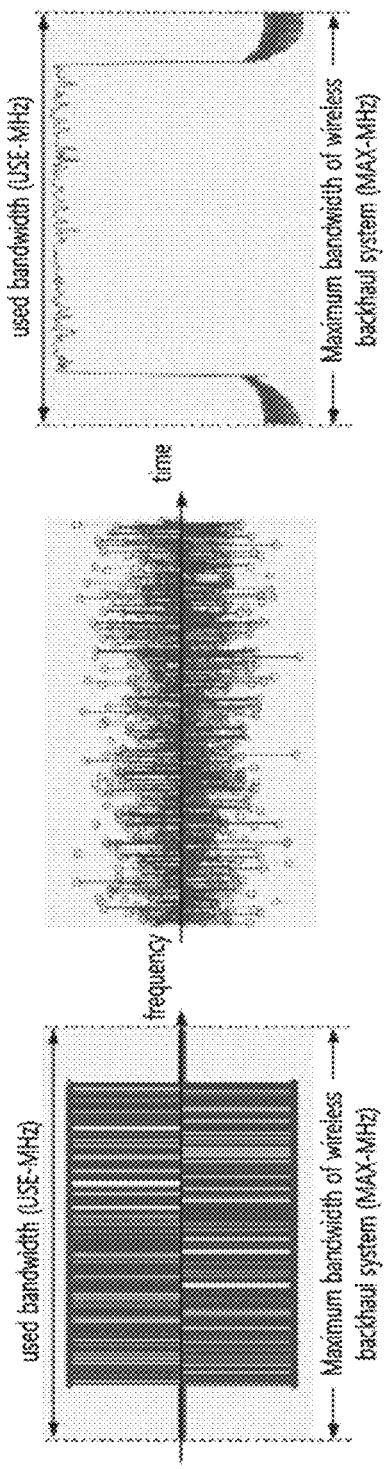

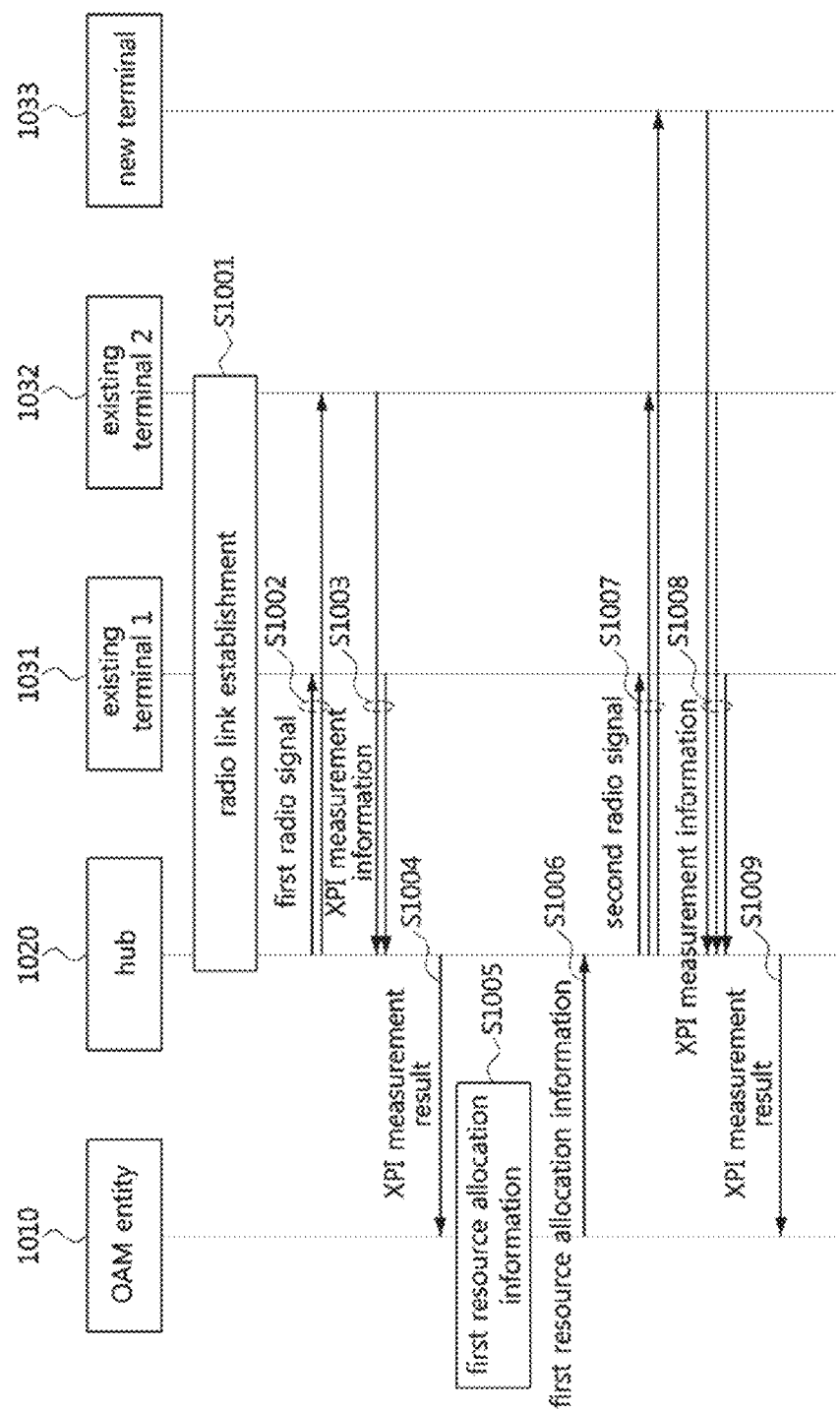

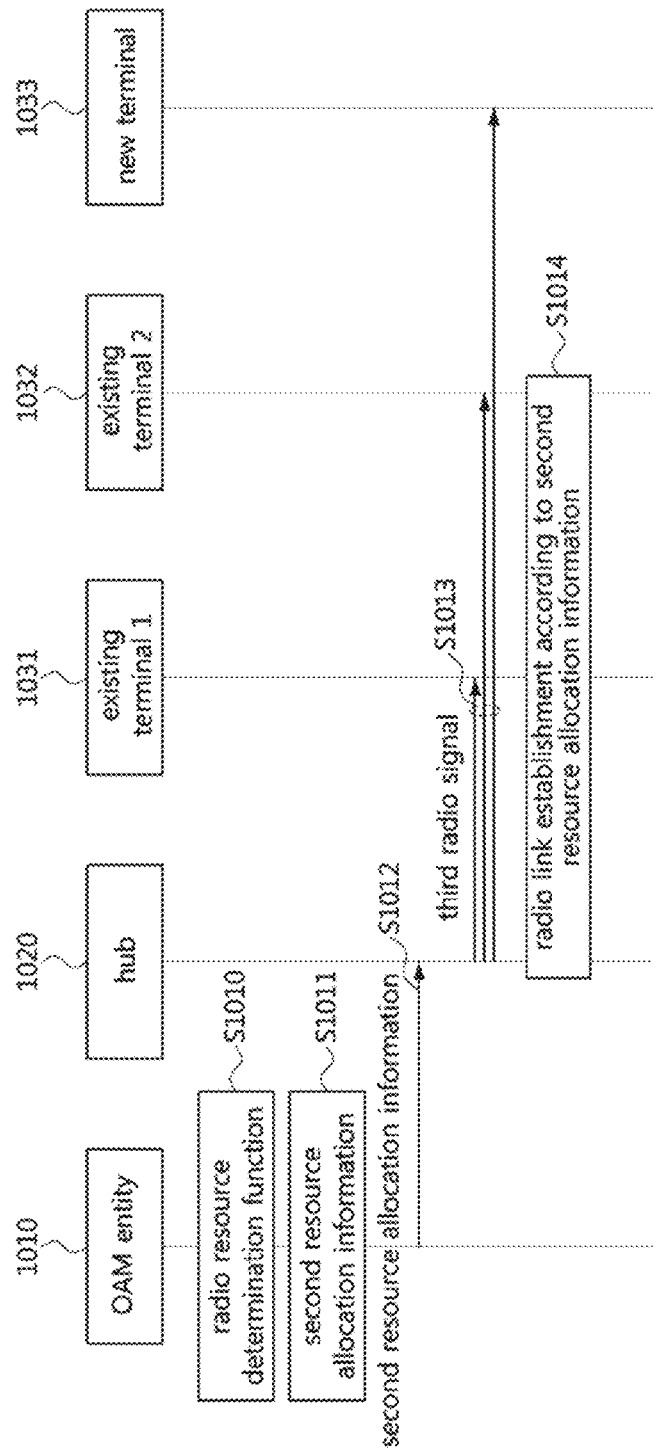

ns in a commu-
METHOD AND APPARATUS FOR MANAGING RADIO RESOURCES IN WIRELESS BACKHAUL SYSTEM

CROSS-REFERENCE TO RELATED APPLICATIONS

This application claims priority to Korean Patent Application No. 10-2019-0112250 filed on Sep. 10, 2019 with the Korean Intellectual Property Office (KIPO), the entire contents of which are hereby incorporated by reference.

BACKGROUND

1. Technical Field

The present disclosure relates generally to methods for managing a wireless link and radio resources in a communication system, and more specifically, to techniques for managing radio resources including polarization resources in a communication system including an access network, an Xhaul network, and a core network.

2. Related Art

A communication system (hereinafter, an integrated communication system) using a higher frequency band (e.g., a frequency band of 6 GHz or above) than a frequency band (e.g., a frequency band of 6 GHz or below) of the long term evolution (LTE) based communication system (or, LTE-A based communication system) as well as the frequency band of the LTE-based communication system is being considered for processing of soaring wireless data. The integrated communication system may include an access network, an Xhaul network, and a core network, and the Xhaul network may support communications between the access network and the core network. The Xhaul network may support communications through an E-band, which is a frequency band suitable for a long-range wireless link.

A wireless backhaul system using the millimeter wave band (i.e., E-band) operates mainly based on a single carrier modulation (SCM) scheme having better peak-to-average power ratio (PARP) characteristics than a multi-carrier modulation (MCM) scheme used in the LTE or LIE-A based communication system. In addition, the wireless backhaul system usually operates based on a point-to-point (P2P) scheme in which information is exchanged using the SCM scheme between two fixed locations. However, development of a point-to-multipoint (P2MP) system capable of accommodating multiple users is increasingly being considered.

However, in the P2MP wireless backhaul system using the SCM scheme, a time division multiplexing access (TDMA) scheme should be used as a resource allocation scheme to accommodate multiple users. This has a problem of a low data transmission efficiency due to the overhead of data framing. In addition, there is a problem in that a data receiving side should have a demodulator having a complicated structure for performing carrier synchronization, bit time recovery, and frame synchronization.

SUMMARY

Accordingly, exemplary embodiments of the present disclosure provide methods for resource allocation using the MCM scheme and a dual polarization scheme to support accesses of multiple users in a wireless backhaul system.

An operation method of a first node belonging to an Xhaul network in a wireless backhaul system including the Xhaul network, according to a first exemplary embodiment of the present disclosure for achieving the above objective, may comprise: transmitting first resource allocation information to a second node and third nodes; receiving, from the second node, information of cross polarization interferences (XPIs) measured for wireless signals through wireless links generated based on the first resource allocation information; generating second resource allocation information indicating resources allocated to each of the second node and the third nodes based on the information of the XPIs; and transmitting the second resource allocation information to the second node and the third nodes, wherein the XPIs for the wireless signals are measured by the third nodes.

The second resource allocation information may indicate time resources, frequency resources, and polarization resources having orthogonality and different polarization characteristics.

The first node may be an operation administration and maintenance (OAM) entity of the wireless backhaul system, the second node may be a hub of the wireless backhaul system, and the third nodes may be terminals of the wireless backhaul system.

The generating of the second resource allocation information may further comprise: comparing the XPI measured by each of the third nodes with a preset threshold; and allocating polarization resources to each of the third nodes based on a result of the comparison between the XPI measured by each of the third nodes and the preset threshold.

In the allocating of the polarization resources, when the XPI of one of the third nodes is less than or equal to the preset threshold, a dual polarization resource may be allocated to the one of the third nodes.

In the allocating of the polarization resources, when the XPI of one of the third nodes is greater than the preset threshold, a single polarization resource may be allocated to the one of the third nodes.

An operation method of a first node belonging to an Xhaul network in a wireless backhaul system including the Xhaul network, according to a second exemplary embodiment of the present disclosure for achieving the above objective, may comprise: receiving first resource allocation information from a second node; transmitting first wireless signals to third nodes based on the first resource allocation information; receiving information of cross polarization interferences (XPIs) measured for the first wireless signals from the third nodes; transmitting the information of the XPIs to the second node; obtaining, from the second node, second resource allocation information generated based on the XPIs; transmitting second wireless signals to the third nodes based on the second resource allocation information; and establishing wireless links with the third nodes.

The second resource allocation information may indicate time resources, frequency resources, and polarization resources having orthogonality and different polarization characteristics.

The first node may be a hub of the wireless backhaul system, the second node may be an operation administration and maintenance (OAM) entity of the wireless backhaul system, and the third nodes may be terminals of the wireless backhaul system.

Each of the first wireless signals and the second wireless signals may be a signal modulated in a multi-carrier modulation (MCM) scheme.

The first node may include antennas having different polarization characteristics, and in the transmitting of the second wireless signals, the second wireless signals may be transmitted using at least one of the antennas based on the second resource information.

When the XPI of one of the third nodes is greater than a preset threshold, the second resource information may indicate a single polarization resource for the one of the third nodes, and in the transmitting of the second wireless signals, the second wireless signals may be transmitted based on the second resource information using one antenna having single polarization characteristics among the antennas.

When the XPI of one of the third nodes is less than or equal to a preset threshold, the second resource information may indicate a dual polarization resource for the one of the third nodes, and in the transmitting of the second wireless signals, the second wireless signals may be transmitted based on the second resource information using different antennas having different polarization characteristics among the antennas.

A first node belonging to an Xhaul network in a wireless backhaul system including the Xhaul network, according to a third exemplary embodiment of the present disclosure for achieving the above objective, may comprise a processor and a memory storing at least one instruction executable by the processor, wherein when executed by the processor, the at least one instruction causes the processor to: receive first resource allocation information from a second node; transmit first wireless signals to third nodes based on the first resource allocation information; receive information of cross polarization interferences (XPIs) measured for the first wireless signals from the third nodes; transmit the information of the XPIs to the second node; obtain, from the second node, second resource allocation information generated based on the XPIs; transmit second wireless signals to the third nodes based on the second resource allocation information; and establish wireless links with the third nodes.

The second resource allocation information may indicate time resources, frequency resources, and polarization resources having orthogonality and different polarization characteristics.

The first node and the third nodes are Xhaul device units (XDUs), and the second node is an operation administration and maintenance (OAM) entity of the wireless backhaul system.

Each of the first wireless signals and the second wireless signals may be a signal modulated in a multi-carrier modulation (MCM) scheme.

The first node may include antennas having different polarization characteristics, and in the transmitting of the second wireless signals, the second wireless signals may be transmitted using at least one of the antennas based on the second resource information.

When the XPI of one of the third nodes is greater than a preset threshold, the second resource information may indicate a single polarization resource, and the at least one instruction may further cause the processor to transmit the second wireless signals based on the second resource information using one antenna having single polarization characteristics among the antennas.

When the XPI of one of the third nodes is less than or equal to a preset threshold, the second resource information may indicate a dual polarization resource for the one of the third nodes, and the at least one instruction may further cause the processor to transmit the second wireless signals based on the second resource information using different antennas having different polarization characteristics among the antennas.

According to the exemplary embodiments of the present disclosure, the wireless backhaul system can accommodate more users with lower complexity than the resource allocation scheme based on the SCM scheme, by simultaneously considering the MCM scheme and the dual polarization in the resource allocation for communication nodes.

BRIEF DESCRIPTION OF DRAWINGS

FIG. 8C is a conceptual diagram illustrating a second exemplary embodiment of a transmission signal generation result of a communication node constituting a wireless backhaul system.

FIGS. 10A and 10B are a sequence chart illustrating an exemplary embodiment of a resource allocation method of a P2MP wireless backhaul system.

DETAILED DESCRIPTION OF THE EMBODIMENTS

Figure 1:
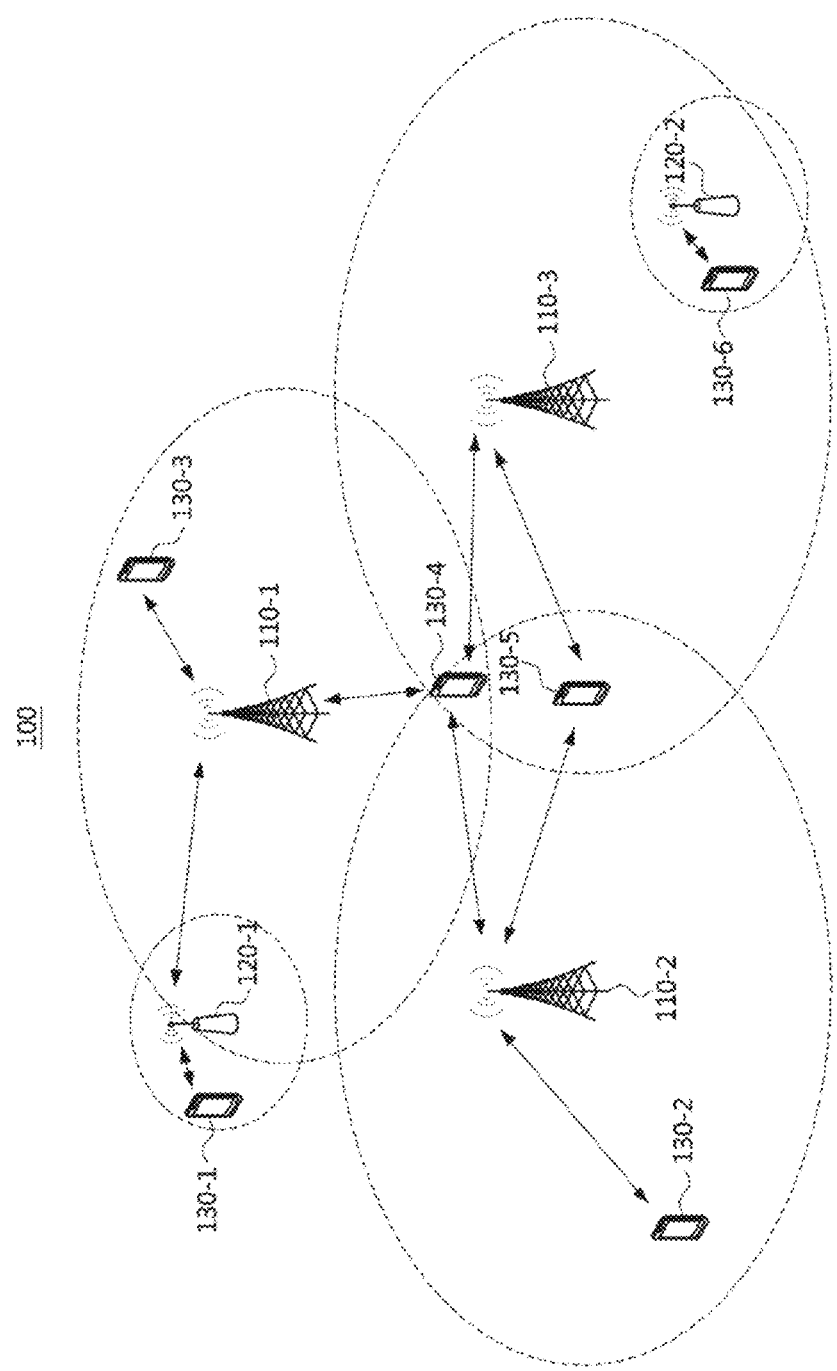
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. However, the communication systems to which exemplary embodiments according to the present disclosure are applied are not restricted to what will be described below. That is, the exemplary embodiments according to the present disclosure may be applied to various communication systems. Here, the term 'communication system' may be used in the same sense as the term 'communication network'.

FIG. 1 is a conceptual diagram illustrating a first exemplary embodiment of a communication system.

As shown in FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system e.g., new radio (NR) system), the core network may include an access and mobility management function (AMF), a user plane function (UPF), a session management function (SMF), and the like.

The plurality of communication nodes 110 to 130 may support a 4G communication defined by the 3rd generation partnership project (3GPP) specifications (e.g., LTE communication protocol or LTE-A communication protocol), a 5G communication (e.g., NR communication protocol), or the like. The 4G communication may be performed in a frequency band of 6 GHz or below, and the 5G communication may be performed in a frequency band of 6 GHz or above as well as the frequency band of 6 GHz or below. For example, for the 4G communication and 5G communication, the plurality of communication nodes may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

Figure 2:
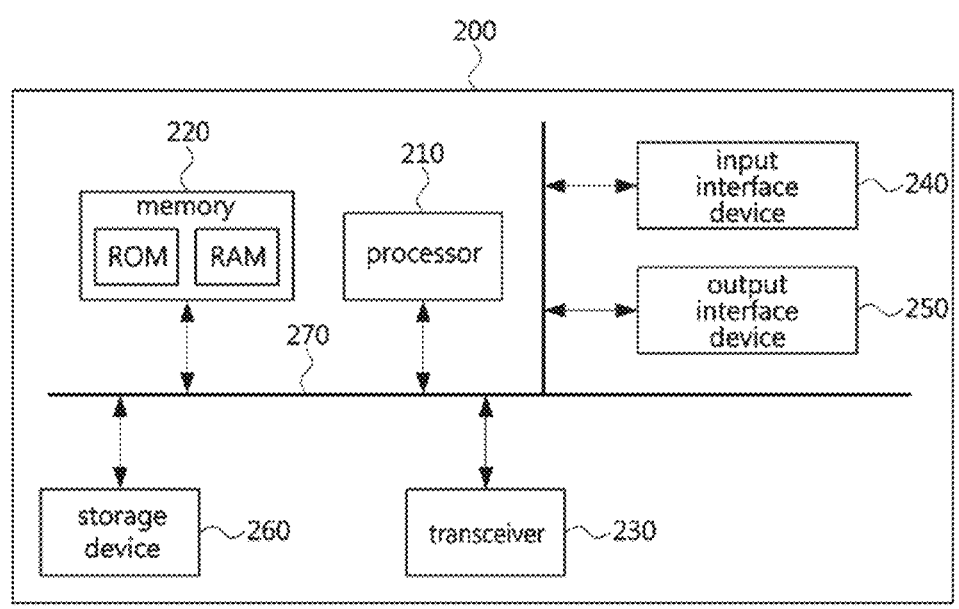
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), a evolved Node-B (eNB), a gNB, an ng-eNB, a base transceiver station (BTS), a radio base station, a radio transceiver, an access point, an access node, a road side unit (RSU), a radio remote head (RRH), a transmission point (TP), a transmission and reception point (TRP), a flexible (F)-TRP, or the like. Each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, a device supporting Internet of things (IoT) functions, a mounted module/device/ terminal, an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, in a communication system, a base station may perform all functions (e.g., remote radio transmission and reception function, baseband processing function, and the like) of a communication protocol. Alternatively, the remote radio transmission and reception function among all the functions of the communication protocol may be performed by a transmission reception point (TRP) (e.g., flexible TRP (f-TRP)), and the baseband processing function among all the functions of the communication protocol may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', a 'centralized BBU', or the like. The TRP may be connected to the BBU block via a wired fronthaul link or a wireless fronthaul link. A communication system composed of a backhaul link and a fronthaul link may be as follows. When a functional-split technique of the communication protocol is applied, the TRP may selectively perform some functions of the BBU or some functions of a medium access control (MAC) or a wireless link control FIG. 3 is a conceptual diagram illustrating a second exemplary embodiment of a Communication system.

Figure 3:
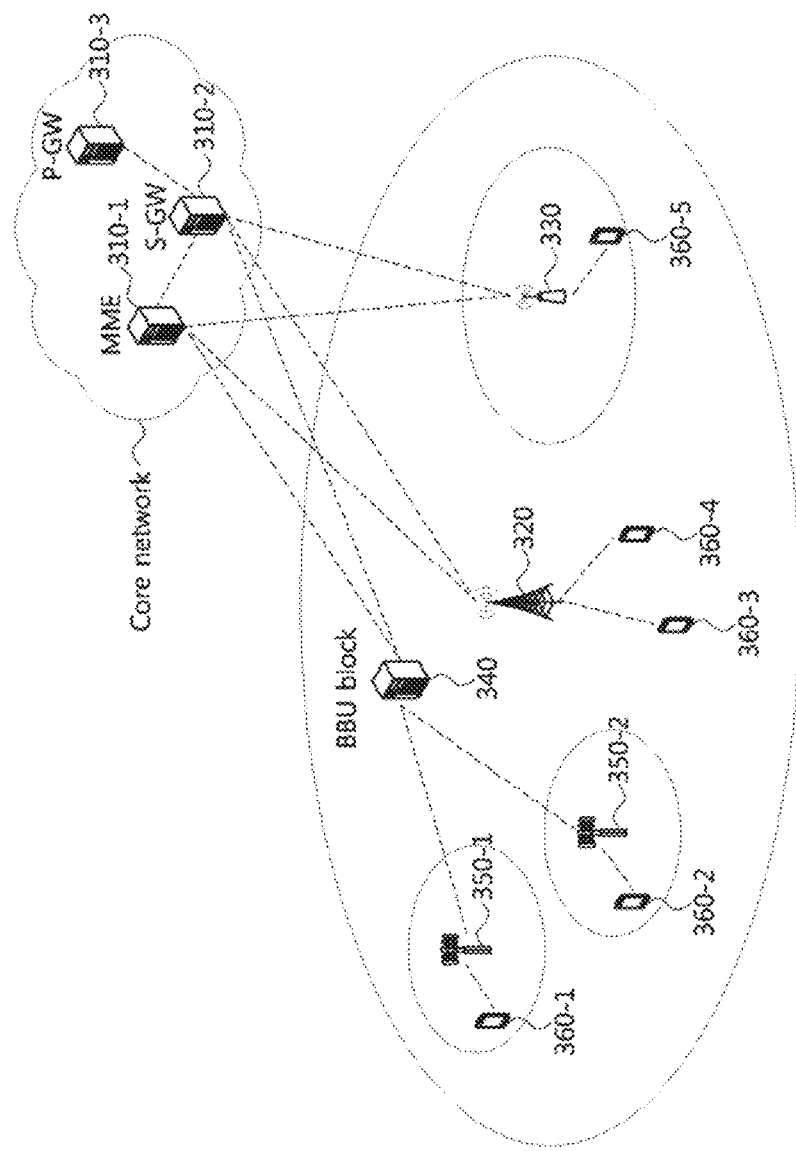
FIG. 3 is a conceptual diagram illustrating a second exemplary embodiment of a communication system.

Referring to FIG. 3, a communication system may include a core network and an access network. The core network may include an MME 310-1, an S-GW 310-2, a P-GW 310-3, and the like. The access network may include a macro base station 320, a small base station 330, TRPs 350-1 and 350-2, terminals 360-1, 360-2, 360-3, 360-4, and 360-5, and the like. The TRPs 350-1 and 350-2 may support the remote radio transmission and reception function among all the functions of the communication protocol, and the baseband processing function for the TRPs 350-1 and 350-2 may be performed by the BBU block 340. The BBU block 340 may belong to the access network or the core network. The communication nodes (e.g., MME, S-GW, P-GW, macro base station, small base station, TRPs, terminals, and BBU block) belonging to the communication system may be configured identically or similarly to the communication node 200 shown in FIG. 2.

The macro base station 320 may be connected to the core network (e.g., MME 310-1, S-GW 310-2) using a wired backhaul link or a wireless backhaul link, and may provide communication services to the terminals 360-3 and 360-4 based on a communication protocol (e.g., 4G communication protocol, 5G communication protocol). The small base station 330 may be connected to the core network (e.g., MME 310-1, S-GW 310-2) using a wired backhaul link or a wireless backhaul link, and may provide communication services to the terminal 360-5 based on a communication protocol (e.g., 4G communication protocol, 5G communication protocol).

The BBU block 340 may be located in the MME 310-1, the S-GW 310-2, or the macro base station 320. Alternatively, the BBU block 340 may be located independently of each the MME 310-1, the S-GW 310-2, and the macro base station 320. The BBU block 340 may support the plurality of TRPs 350-1 and 350-2, and may be connected to each of the plurality of TRPs 350-1 and 350-2 using a wired fronthaul link or a wireless fronthaul link. That is, the link between the BBU block 340 and the TRPs 350-1 and 350-2 may be referred to as a 'fronthaul link'.

The first TRP 350-1 may be connected to the BBU block 340 via a wired fronthaul link or a wireless fronthaul link, and provide communication services to the first terminal 360-1 based on a communication protocol (e.g., 4G communication protocol, 5G communication protocol). The second TRP 350-2 may be connected to the BBU block 340 via a wired fronthaul link or a wireless fronthaul link, and provide communication services to the second terminal 360-2 based on a communication protocol 4G communication protocol, 5G communication protocol).

In the exemplary embodiments to be described below, a communication system including an access network, an Xhaul network, and a core network may be referred to as an 'integrated communication system'. The communication nodes (e.g., MME, S-GW, P-GW, access and mobility function (AMF), user plane function (UPF), BBU block, Xhaul distributed unit (XDU), Xhaul control unit (XCU), base station, TRP, terminal, and the like) may be configured identically or similarly to the communication node 200 shown in FIG. 2. The communication nodes belonging to the Xhaul network may be connected using Xhaul links, and the Xhaul link may be a backhaul link or a fronthaul link.

Also, the S-GW of the integrated communication system may refer to a termination communication node of the core network that exchanges packets (e.g., control information, data) with the base station, and the MME of the integrated communication system may refer to a communication node in the core network, which performs control functions in a radio access section (or, interface) of the terminal. Here, each of the backhaul link, the fronthaul link, the Xhaul link, the XDU, the XCU, the BBU block, the S-GW, and the MME may be referred to as a different term according to a function (e.g., function of the Xhaul network, function of the core network) of a communication protocol depending on a radio access technology (RAT).

Figure 4:
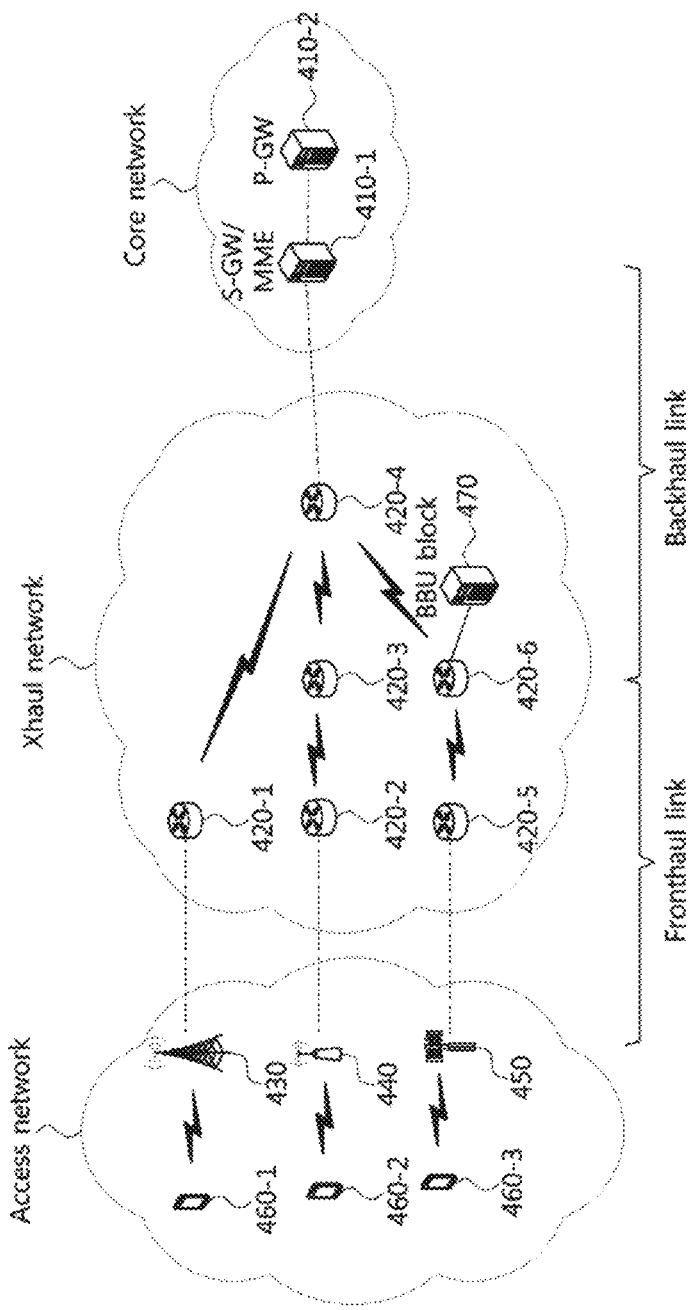
FIG. 4 is a conceptual diagram illustrating an exemplary embodiment of an integrated communication system.

FIG. 4 is a conceptual diagram illustrating an exemplary embodiment of an integrated communication system.

Referring to FIG. 4, the integrated communication system may include an access network, an Xhaul network, and a core network. The Xhaul network may be located between the access network and the core network, and may support communications between the access network and the core network. The communication nodes belonging to the integrated communication system may be configured to be the same as or similar to the communication node 200 shown in FIG. 2. The access network may include a macro base station 430, a small base station 440, a TRP 450, terminals 460-1, 460-2, and 460-3, and the like. The Xhaul network may include a plurality of communication nodes 420-1, 420-2, 420-3, 420-4, 420-5, and 420-6. The communication node constituting the Xhaul network may be referred to as an 'XDU'. In the Xhaul network, the XDUs 420-1, 420-2, 420-3, 420-4, 420-5, and 420-6 may be connected using wireless Xhaul links, and may be connected based on a multi-hop scheme. The core network may include an S-GW/MME 410-1, a P-GW 410-2, and the like. The S-GW/MME 410-1 may refer to a communication node including an S-GW and an MME.

The first XDU 420-1 of the Xhaul network may be connected to the macro base station 430 using a wired link or a wireless link. Alternatively, the first XDU 420-1 may be integrated into the macro base station 430. The second XDU 420-2 of the Xhaul network may be connected to the small base station 440 using a wired link or a wireless link. Alternatively, the second XDU 420-2 may be integrated into the small base station 440. The fifth XDU 420-5 of the Xhaul network may be connected to the TRP 450 using a wired link. Alternatively, the fifth XDU 420-5 may be integrated into the TRP 450.

The fourth XDU 420-4 of the Xhaul network may be connected to the termination communication node (e.g., S-GW/MME 410-1) of the core network using a wired link. Among the plurality of XDUs 420-1, 420-2, 420-3, 420-4, 420-5, and 420-6, the XDU connected to the termination communication node of the core network may be referred to as an 'XDU aggregator'. That is, the fourth XDU 420-4 in the core network may be an XDU aggregator. Communications between the plurality of XDUs 420-1, 420-2, 420-3, 420-4, 420-5, and 420-6 may be performed using an Xhaul protocol. Packets (e.g., data and control information) to which the Xhaul protocol is applied may be transmitted to each of the core network and the access network through the Xhaul links.

The macro base station 430 may provide communication services to the first terminal 460-1 using an access protocol (e.g., 4G communication protocol, 5G communication protocol), and may be connected to the first XDU 420-1 using a wired or wireless link. The macro base station 430 may be connected to the core network through the Xhaul network. The small base station 440 may provide communication services to the second terminal 460-2 using an access protocol (e.g., 4G communication protocol, 5G communication protocol), and may be connected to the second XDU 420-2 using a wired or wireless link. The small base station 440 may be connected to the core network through the Xhaul network.

The TRP 450 may provide communication services to the third terminal 460-3 using an access protocol (e.g., 4G communication protocol, 5G communication protocol), and may be connected to the fifth XDU 420 using a wired link. The TRP 450 may support a remote radio transmission/reception function among all functions of the communication protocol, and a baseband processing function for the TRP 450 may be performed in the BBU block 470.

Meanwhile, radio resources in the access network and the Xhaul network may be configured as follows.

Figure 5A:
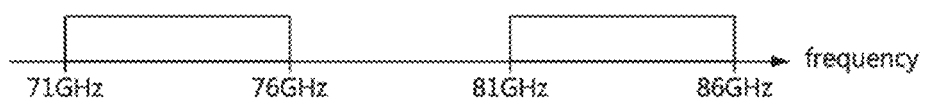
FIG. 5A is a conceptual diagram illustrating a first exemplary embodiment of an E-band.
Figure 5B:
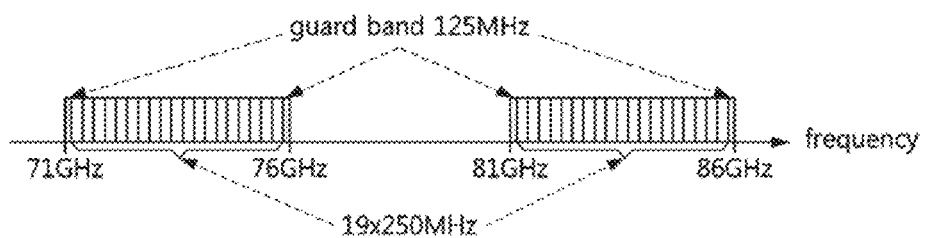
FIG. 5B is a conceptual diagram illustrating a second exemplary embodiment of an E-band.

FIGS. 5A and 5B are conceptual diagrams illustrating an E-band.

Referring to FIG. 5A, an E-band may include a 71 GHz to 76 GHz band and a 81 GHz to 86 GHz band. Referring to FIG. 5B, the 71 GHz to 76 GHz band may include a plurality of channels (19 channels with reference to FIG. 5B) and guard bands. In addition, the 81 GHz to 86 GHz band may include a plurality of channels (19 channels with reference to FIG. 5B) and guard bands. Referring to FIG. 5B, each channel included in the E-band (i.e., the 71 GHz to 76 GHz band and the 81 GHz to 86 GHz band) may have a bandwidth of 250 MHz. Also, each of the guard bands included in the E-band (i.e., the 71 GHz to 76 GHz band and the 81 GHz to 86 GHz band) may have a bandwidth of 125 MHz. Each channel included in the E-band may be configured in a frequency division duplex (FDD) scheme or a time division duplex (TDD) scheme.

Figure 6A:
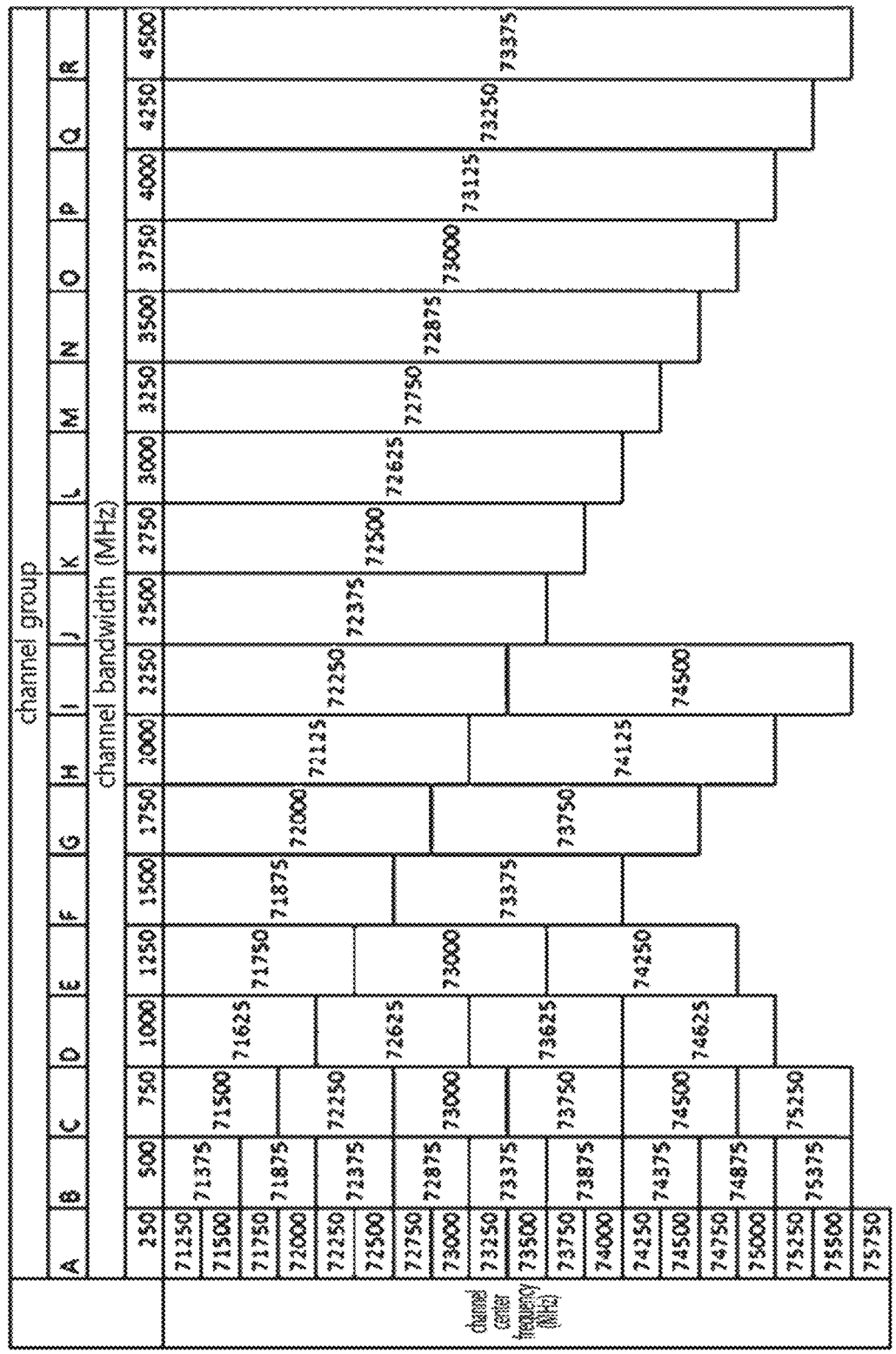
FIG. 6A is a conceptual diagram illustrating an exemplary embodiment of channel arrangement in a 71 GHz to 76 GHz band of an E-band.
Figure 6B:
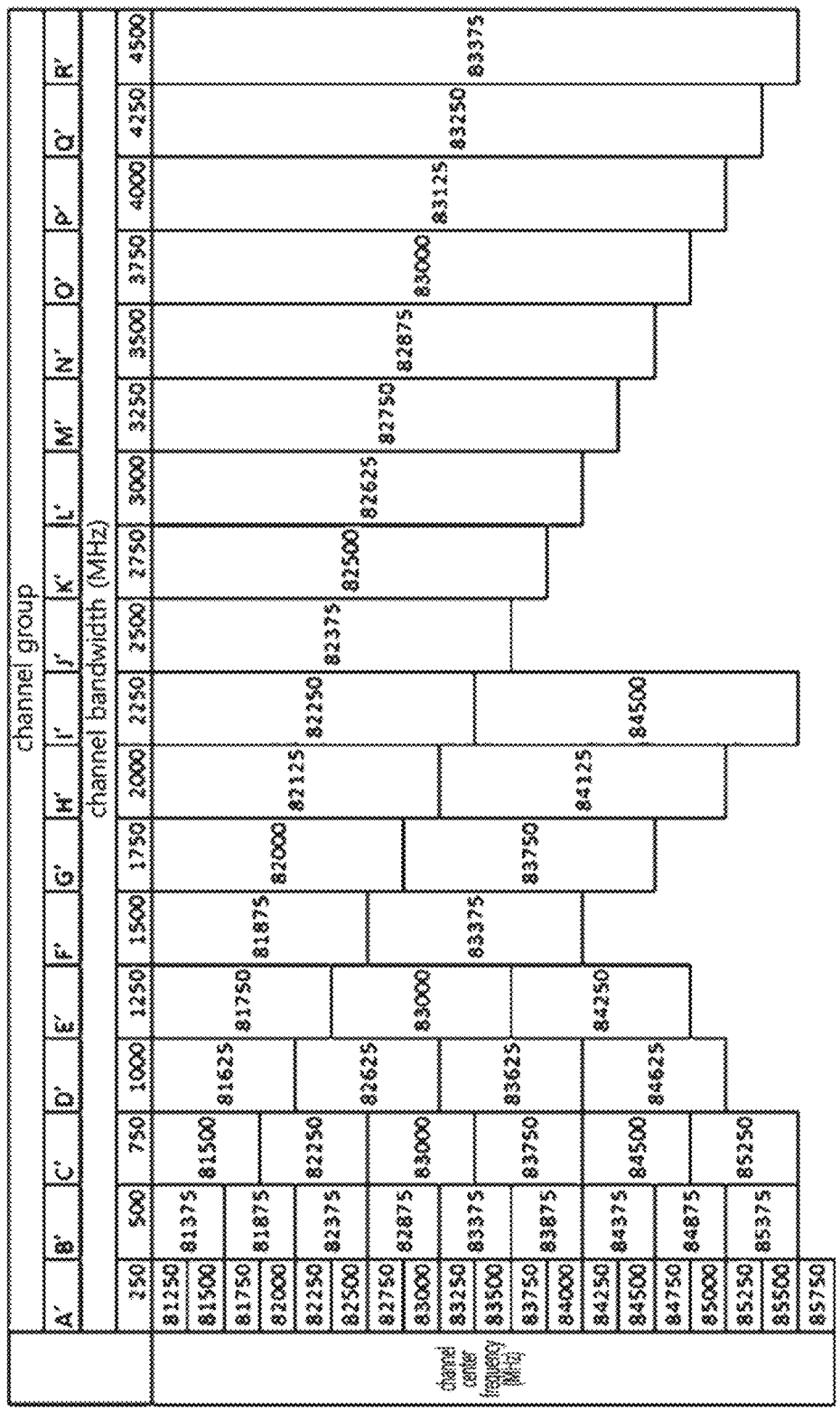
FIG. 6B is a conceptual diagram illustrating an exemplary embodiment of channel arrangement in an 81 GHz to 86 GHz band of an E-band.

FIGS. 6A and 6B are conceptual diagrams illustrating exemplary embodiments of channel arrangement in an E-band.

Referring to FIG. 6A, the 71 GHz to 76 GHz band of the E-band may include at least one channel. Referring to FIG. 6B, the 81 GHz to 86 GHz band of the E-band may include at least one channel. Referring to FIGS. 6A and 6B, bandwidths of channels included in the E-band may be preset, and may be set differently from each other according to a channel group. For example, in case of a channel group A, the bandwidth of the channel may be 250 MHz, and each band may include 19 channels. In case of a channel group R, the bandwidth of the channel may be 4500 MHz, and each band may include one channel.

Figure 7A:
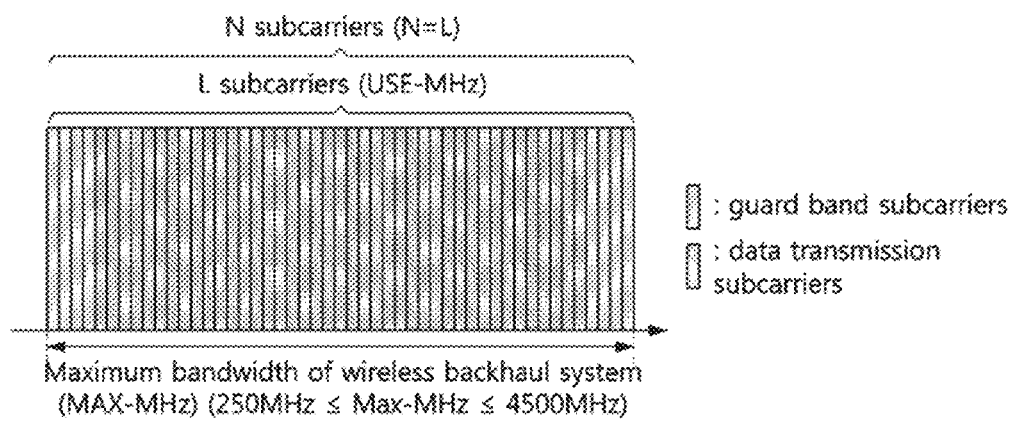
FIG. 7A is a conceptual diagram illustrating a first exemplary embodiment of channel bandwidth use of a communication node constituting a wireless backhaul system.
Figure 7B:
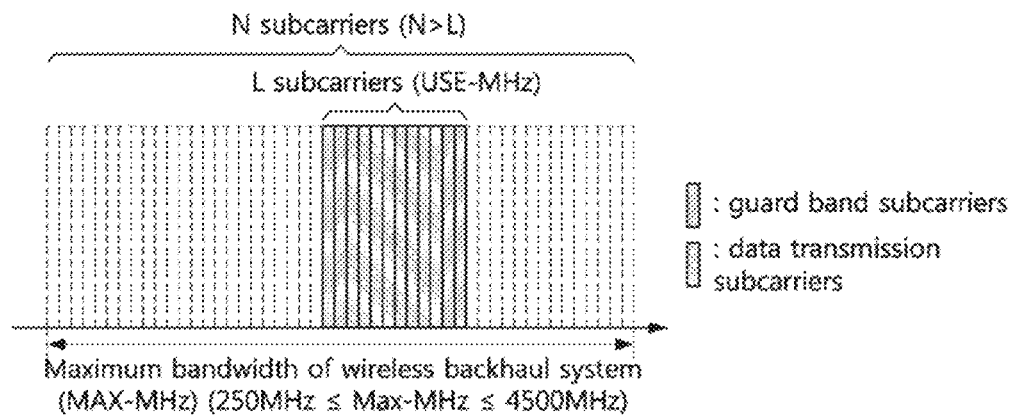
FIG. 7B is a conceptual diagram illustrating a second exemplary embodiment of channel bandwidth use of a communication node constituting a wireless backhaul system.

FIGS. 7A and 7B are conceptual diagrams illustrating exemplary embodiments of channel bandwidth use of a communication node constituting a wireless backhaul system.

Referring to FIGS. 7A and 7B, the maximum bandwidth of the wireless backhaul system may be determined based on the channel group as shown in FIGS. 6A and 6B. For example, the maximum bandwidth of the wireless backhaul system may be a preset value from 250 MHz (for the channel group A) to 4500 MHz (for the channel group R).

The communication nodes (e.g., XCU, XDU, etc.) of the wireless backhaul system may transmit data to other communication nodes using at least a part of the maximum bandwidth. A part of the maximum bandwidth used by a communication node of the wireless backhaul system may be referred to as a 'used bandwidth'. Referring to FIG. 7A, the used bandwidth of the communication node may be the same as the maximum bandwidth of the wireless backhaul system. The communication node may transmit and receive signals using subcarriers located in a region excluding the guard bands included in the maximum bandwidth. Referring to FIG. 7B, the used bandwidth of the communication node may be smaller than the maximum bandwidth of the wireless backhaul system. The communication node may transmit and receive signals using subcarriers located in a region excluding the guard bands included in the used bandwidth.

Figure 8A:
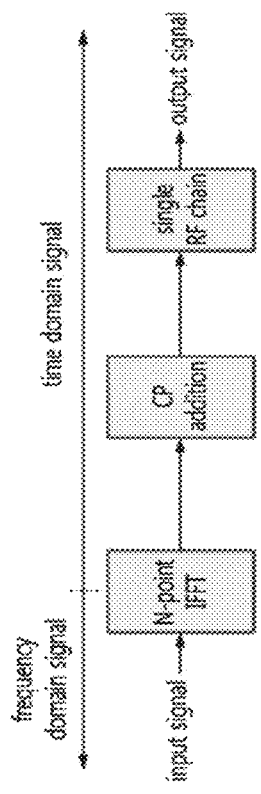
FIG. 8A is a conceptual diagram illustrating a transmission signal generation operation of a communication node constituting a wireless backhaul system.
Figure 8B:
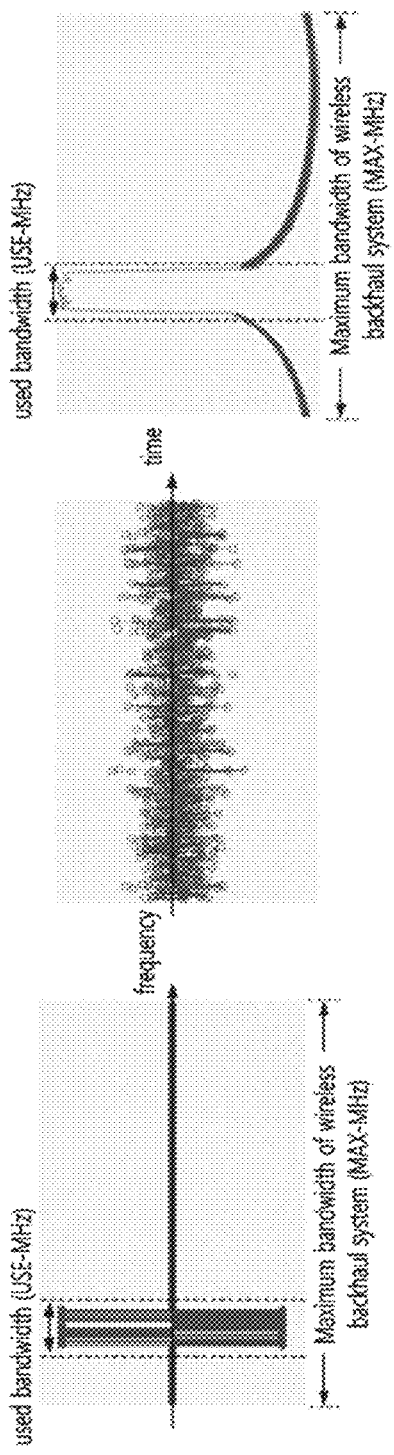
FIG. 8B is a conceptual diagram illustrating a first exemplary embodiment of a transmission signal generation result of a communication node constituting a wireless backhaul system.

FIGS. 8A, 8B, and 8C are conceptual diagrams illustrating exemplary embodiments of a transmission signal generation operation of a communication node constituting a wireless backhaul system.

Referring to FIG. 8A, each communication node (e.g., XCU, XDU, or the like) constituting the wireless backhaul system may generate a plurality of data transmission signals in a frequency domain. For example, each communication node may generate a frequency-domain transmission signal by loading data on subcarriers located in the used bandwidth.

Each communication node constituting the wireless backhaul system may generate a time-domain transmission signal by performing inverse fast Fourier transform (IFFT) on the frequency-domain transmission signal. Referring to FIG. 8B, when the used bandwidth is smaller than the maximum bandwidth, the communication node may input the frequency-domain transmission signal loaded on the used bandwidth to an N-point IFFT. Also, referring to FIG. 8C, when the used bandwidth is the same as the maximum bandwidth, the communication node may input the frequency-domain transmission signal loaded on subcarriers excluding the guard bands within the maximum bandwidth to the N-point IFFT. The N-point IFFT may be a transform entity that transforms a frequency-domain signal to generate a time-domain signal. The N-point IFFT may be a transform entity capable of handling the maximum bandwidth of the wireless backhaul system.

The communication node (e.g., XCU, XDU, or the like) constituting the wireless backhaul system may remove inter symbol interferences (ISI) between symbols included in the time-domain signal by inserting a cyclic prefix (CP) into the generated time-domain signal. Then, the communication node constituting the wireless backhaul system may transmit the time-domain signal to other communication node(s) of the wireless backhaul system by using a radio frequency (RF) chain. The communication node may be configured with a single RF chain, and the RF chain may include at least one antenna. The antenna included in the RF chain may be an antenna having a polarization characteristic, which is one of a vertically-polarized antenna or a horizontally-polarized antenna.

Figure 9A:
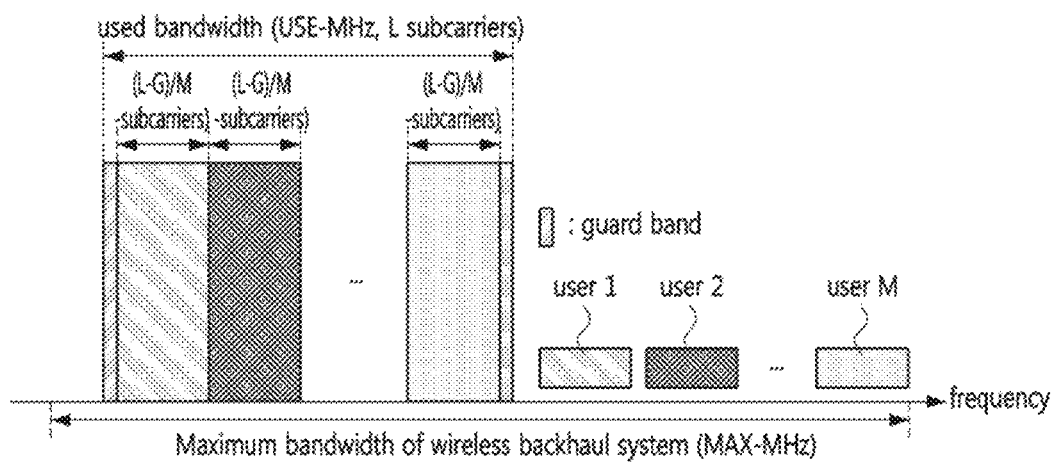
FIG. 9A is a conceptual diagram illustrating a first exemplary embodiment of resource allocation for supporting multiple accesses in a P2MP wireless backhaul system.
Figure 9B:
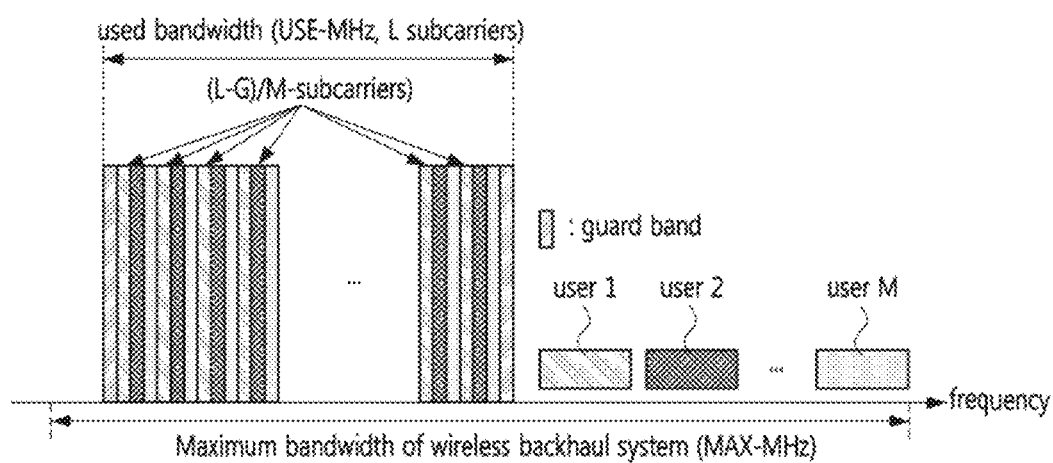
FIG. 9B is a conceptual diagram illustrating a second exemplary embodiment of resource allocation for supporting multiple accesses in a P2MP wireless backhaul system.

FIGS. 9A and 9B are conceptual diagrams illustrating exemplary embodiments of resource allocation for supporting multiple accesses in a point to multi point (P2MP) wireless backhaul system.

Referring to FIGS. 9A and 9B, the wireless backhaul system may support multiple accesses using resources of the used bandwidth. The used bandwidth may be smaller than or equal to the maximum bandwidth defined by the channels according to the channel groups shown in FIGS. 6A to 6B. In the wireless backhaul system, some of the subcarriers included in the used bandwidth may be guard bands. For example, subcarriers located at both ends of the used bandwidth may be guard bands.

The wireless backhaul system may allocate subcarriers excluding guard band subcarriers among subcarriers included in the used bandwidth to a plurality of communication nodes (e.g., XDUs, etc.). The plurality of communication nodes may transmit and receive data using some subcarriers of the allocated used bandwidth. The wireless backhaul system may allocate the same number of subcarriers to each communication node. For example, when the used bandwidth includes L subcarriers, and the guard bands include G subcarriers, the wireless backhaul system may allocate (L-G)/M subcarriers to each of M communication nodes. Alternatively, the wireless backhaul system may allocate subcarriers to each communication node in proportion to capacity of data to be transmitted by the each communication node.

The wireless backhaul system may allocate resources included in the used bandwidth to communication nodes using a preconfigured resource allocation scheme. For example, referring to FIG. 9A, the wireless backhaul system may allocate resources to communication nodes in a localized allocation scheme. In addition, referring to FIG. 9B, the wireless backhaul system may allocate resources to communication nodes in a distributed allocation scheme.

When resource allocations for a plurality of communication nodes are completed and there is no change of the communication nodes constituting the wireless backhaul system, the wireless backhaul system may use a fixed allocation scheme that continuously uses the previously allocated resources to allocate resources to the communication nodes. However, when an existing communication node constituting the wireless backhaul system is excluded or a new communication node is added to the wireless backhaul system, the wireless backhaul system may coordinate resources to be allocated to the respective communication nodes. Further, when a variation of the resources to be allocated to the communication nodes is large, the wireless backhaul system may also coordinate the resources to be allocated to the communication nodes.

FIGS. 10A and 10B are a sequence chart illustrating an exemplary embodiment of a resource allocation method of a P2MP wireless backhaul system.

Referring to FIGS. 10A to 10B, the wireless backhaul system may include an XCU and a plurality of XDUs, and the plurality of XDUs may further include a master XDU and a plurality of slave XDUs. The XCU may perform an operation administration and maintenance (OAM) function of the wireless backhaul system, and may be referred to as an 'OAM entity' 1010. In addition, the master XDU may function as a hub 1020 of the wireless backhaul system. In addition, the plurality of slave XDUs may function as terminals 1031, 1032, and 1033 of the wireless backhaul system.

The OAM entity 1010 may coordinate radio resources to be allocated to each of the hub 1020 and terminals 1031, 1032, and 1033. In addition, the plurality of terminals 1031, 1032, and 1033 may include the existing terminals 1031 and 1032 connected to the hub 1020 through wireless links in advance, and the new terminal 1033 added after the wireless links are established.

Referring to FIGS. 10A to 10B, wireless links between the hub 1020 of the wireless backhaul system and the existing terminals 1031 and 1032 may be established in advance (S1001). The hub 1020 may generate wireless signals to be transmitted to the existing terminals 1031 and 1032. The hub 1020 may transmit the wireless signals to the plurality of existing terminals 1031 and 1032 through the wireless links established with the terminals. Specifically, the hub 1020 may transmit the wireless signals to the existing terminals 1031 and 1032 through the existing wireless links.

The terminals may receive the wireless signals from the hub 1020 through the existing wireless links. The terminals may measure radio channel states based on the received wireless signals, and may measure their own buffer status. For example, the terminals may measure state information such as channel quality information (CQI) and channel state information (CSI) of the wireless signals. In addition, terminals may measure cross polarization interference (XPI) of the received wireless signals.

The existing terminals 1031 and 1032 may report the measured radio channel state information and buffer status information to the hub 1020. Each of the terminals may generate a wireless signal for transmission to the hub 1020. Each of the terminals may transmit the generated wireless signal, and the wireless signal may further include the radio channel state information and the buffer status information measured by the terminal.

The hub 1020 may receive the wireless signals generated from the existing terminals 1031 and 1032, and acquire the radio channel state information and the buffer status information from the received wireless signals. For example, the hub 1020 may acquire the radio channel state information such as CQI, CSI, and XPI information from the terminals. The hub 1020 may deliver the XPI information obtained from the plurality of terminals to the OAM entity 1010. For example, the hub 1020 may map an identifier of the terminal to the XPI information measured by the terminal, and the OAM entity 1010 may transmit a message including the identifier of each of the plurality of terminals and the XPI information measured by each terminal. The OAM entity 1010 may acquire the XPI information measured by the terminals from the hub 1020.

The hub 1020 may periodically smit wireless signals to the terminals (S1002). In addition, the hub 1020 may periodically acquire the XPI information for the wireless signals from the terminals (S1003). The OAM entity 1010 may periodically acquire the XPI information of the terminals (S1004).

According to an exemplary embodiment of the present disclosure, a case in which the new terminal 1033 is added while the wireless links between the hub 1020 and the existing terminals 1031 and 1032 are established may occur. When the new terminal 1033 is added, the OAM entity 1010 may generate first resource allocation information based on the resource allocation information used for establishing the wireless links between the huh 1020 and the existing terminals 1031 and 1032 and the radio channel state information and the buffer status information (e.g., XPI information, etc.) measured by the existing terminals 1031 and 1032 (S1005). The first resource allocation information may include information on resources allocated to the existing terminals 1031 and 1032 and information on resources allocated to the new terminal 1033. The OAM entity 1010 may transmit the first resource allocation information to the hub 1020, the existing terminals 1031 and 1032, and the new terminal 1033 (S1006).

The hub 1020 may receive the first resource allocation information from the OAM entity 1010 (S1006). The hub 1020 may transmit second wireless signals to the existing terminals 1031 and 1032 and the new terminal 1033 based on the first resource allocation information (S1007).

The terminals (e.g., the existing terminals 1031 and 1032 and the new terminal 1033) may receive the wireless signals from the hub 1020 (S1007). The terminals (e.g., the existing terminals 1031 and 1032 and the new terminal 1033) may measure XPI of the received wireless signals. The terminals may generate wireless signals, and may transmit the generated wireless signals to the hub 1020 through the wireless links (S1008). The wireless signal transmitted from the terminal in S1008 may further include identification information of the terminal, radio channel state information and buffer status information (e.g., XPI information, etc.) measured by the terminal, and/or the like.

The hub 1020 may receive the wireless signals from the terminals (e.g., the existing terminals 1031 and 1032 and new terminal 1033), and may acquire the radio channel state information and butter status information (e.g., XPI information, etc.) measured by the terminal from the wireless signals (S1008). The hub 1020 may deliver the radio channel state information and buffer status information (e.g., XPI information, etc.) acquired from the terminals (e.g., the existing terminals 1031 and 1032 and the new terminal 1033) to the OAM entity 1010 (S1009). For example, the hub 1020 may map the identifier of each of the terminals to the radio channel state information and the buffer status information (e.g., XPI information, etc.) measured by each of the terminals, may transmit, to the OAM entity 1010, a message including the identifier of each of the terminals and the radio channel state information and the buffer status information (e.g., XPI information, etc.) measured by each of the terminals (S1009).

The OAM entity 1010 may acquire the channel state information and buffer status information (e.g., XPI information, etc.) measured by the terminals 1031, 1032, and 1033 from the hub 1020 (S1009). The OAM entity 1010 may perform a radio resource determination function for changing radio resources to be allocated to the terminals 1031, 1032, and 1033 based on the measured channel state information and buffer status information (S1010). The OAM entity 1010 performing the radio resource determination function may determine a degree of radio resource change on a terminal basis. For example, the OAM entity 1010 may change information on resources to be allocated to the terminals (e.g., the existing terminals 1031 and 1032 and the new terminal 1033) (S1010). That is, the OAM entity 1010 may generate second resource allocation information further including information on resources to be allocated to the new terminal 1033 (S1011).

The hub 1020 may receive the second resource allocation information from the OAM entity 1010 (S1012). The hub 1020 may transmit third wireless signals to the existing terminals 1031 and 1032 and the new terminal 1033 based on the second resource allocation information (S1013). The hub 1020 may establish wireless links with the existing terminals 1031 and 1032 and the new terminal 1033 based on the second resource allocation information (S1014).

Figure 11A:
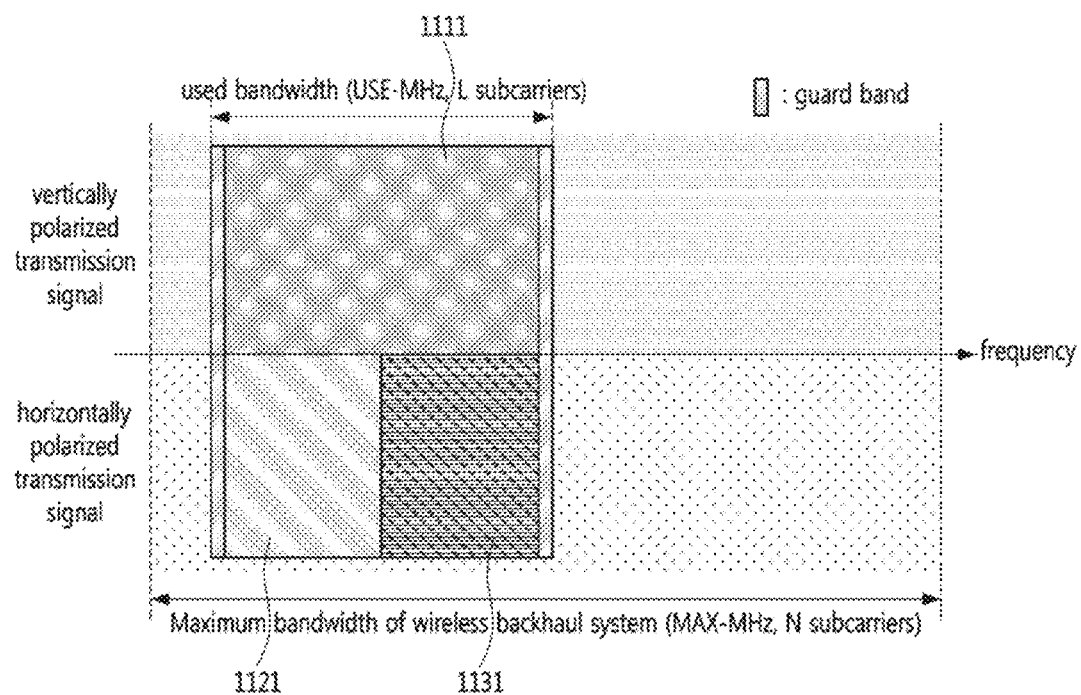
FIG. 11A is a conceptual diagram illustrating a first exemplary embodiment of dual polarization resource allocation in a P2MP wireless backhaul system.
Figure 11B:
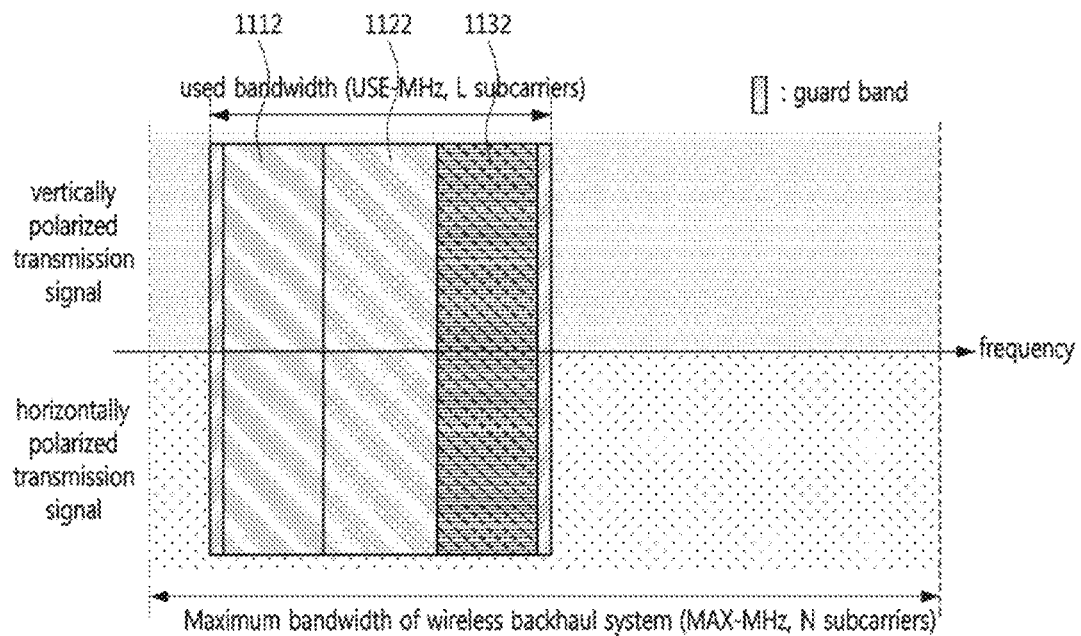
FIG. 11B is a conceptual diagram illustrating a second exemplary embodiment of dual polarization resource allocation in a P2MP wireless backhaul system.
Figure 11C:
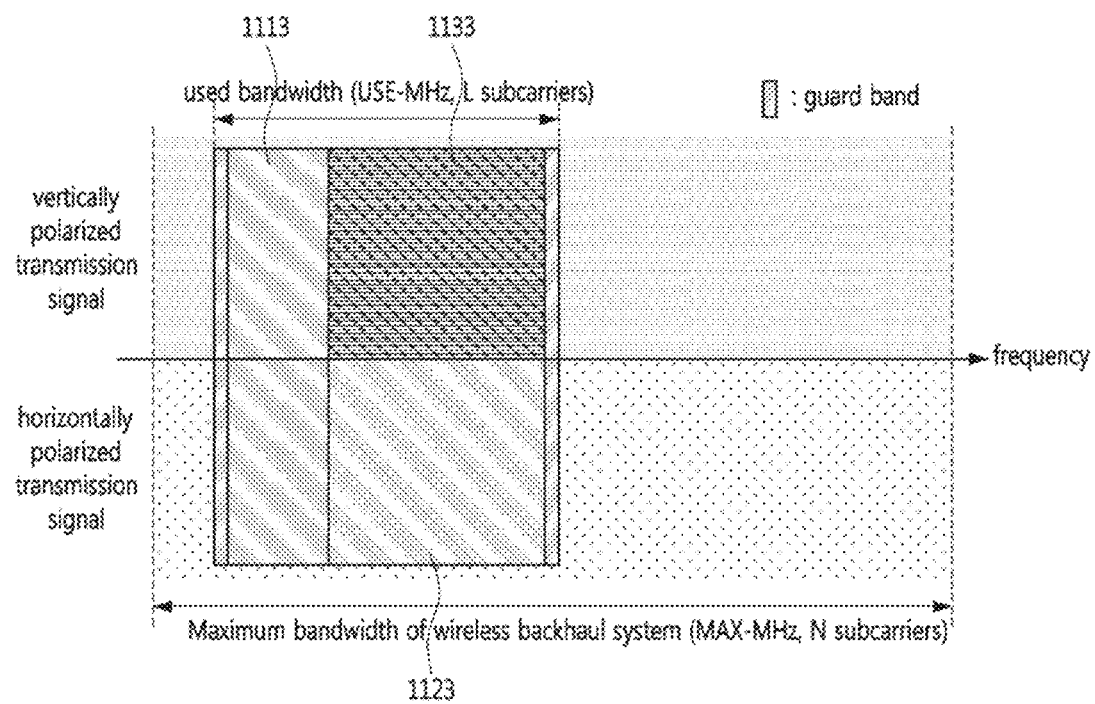
FIG. 11C is a conceptual diagram illustrating a third exemplary embodiment of dual polarization resource allocation in a P2MP wireless backhaul system.

FIGS. 11A to 11C are conceptual diagrams illustrating exemplary embodiment of dual polarization resource allocation in a P2MP wireless backhaul system.

A node of the wireless backhaul system may multiplex wireless signals using frequency resources, time resources, space resources, and code resources. Referring to FIGS. 11A to 11C, the node of the wireless backhaul system may multiplex the wireless signals by further utilizing electric field polarization. The node may multiplex the wireless signals by using different polarization characteristics, for example, the node may allocate resources by using orthogonality between vertical polarization and horizontal polarization through a horizontally-polarized antenna and a vertically-polarized antenna. The node may transmit different data through the same resources (e.g., time resources, frequency resources, etc.) by using antennas having different polarization characteristics, thereby obtaining a polarization multi-input multi-output (MIMO) effect.

In a resource allocation scheme in the P2P wireless backhaul system in which one hub 1020 and one terminal are connected, the node may determine whether to use dual polarization resources according to capacity of data to be transmitted. However, in a resource allocation scheme in the P2MP wireless backhaul system in which one hub 1020 and a plurality of terminals are connected, the OAM entity 1010 may determine whether to allocate different polarization resources to the terminals based on the XPI information of received signals of the respective terminals.

The OAM entity 1010 performing the radio resource determination function in the step S1010 may compare the XPI measured by each terminal with a preset threshold. The OAM entity 1010 may generate the second resource allocation information based on the result of comparison between the XPI measured by the respective terminals 1031, 1032, and 1033 and the preset threshold (S1011). The second resource information may include information on resources to be allocated to the hub 1020 and the respective terminals (e.g., the existing terminals 1031 and 1032 and the new terminal 1033), and specifically, the second resource allocation information may further include time resources, frequency resources, and polarization information.

The second resource allocation information may be resource allocation information generated by reflecting XPI information of the new terminal 1033. For example, when the XPI measured by a specific terminal is greater than a preset threshold, the OAM entity 1010 may allocate a resource having a single polarization characteristic to the terminal. That is, the OAM entity 1010 may instruct the hub 1020 and the terminals 1031, 1032, and 1033 to transmit and receive signals using a single polarized antenna. In addition, when the XPI measured by a specific terminal is less than or equal to the preset threshold, the OAM entity 1010 may allocate a dual polarization resource to the terminal. That is, the OAM entity 1010 may instruct the hub 1020 and the terminals to transmit and receive signals using differently polarized antennas (e.g., vertically-polarized antennas and horizontally-polarized antennas).

Therefore, when the XPI values received from all terminals connected to the hub 1020 are greater than a preset threshold, the OAM entity 1010 may allocate a single polarized resources 1111, 1121, or 1131 to each of the terminals 1031, 1032, and 1032 connected through a wireless link with the hub 1020 as shown in FIG. 11A. Alternatively, when the XPI values received from all terminals connected to the hub 1020 are less than or equal to the preset threshold, the OAM entity 1010 may allocate a dual-polarized resource 1112, 1122, or 1132 to each of the terminals connected through a wireless link with the hub 1020 as shown in FIG. 11B. In addition, when the XPI values received from some terminals connected to the hub 1020 are less than or equal to the preset threshold, the OAM entity 1010 may allocate dual-polarized resources 1113 to some 1031 of the terminals through the wireless link with the hub 1020 and allocate a single polarized resource 1123 or 1133 to the remaining terminals 1032 and 1033, as shown in FIG. 11C.

However, although FIGS. 11A to 11C describe exemplary embodiments in which radio resources are allocated to terminals using a local allocation scheme, it may be obvious that resources also can be allocated to terminals using a distributed allocation scheme. For example, the OAM entity 1010 may allocate resources to the existing terminal 1032 and the new terminal 1033 of FIG. 11A in a distributed allocation scheme. Accordingly, the resource 1121 allocated to the existing terminal 1032 and the resource 1131 allocated to the new terminal 1033 may be arranged in the distributed manner. In addition, the OAM entity 1010 may allocate resources to the existing terminals 1031 and 1032 and the new terminal of FIG. 11B in a distributed allocation scheme. Accordingly, the resources 1110 and 1122 allocated to the existing terminals 1031 and 1032 and the resource 1132 allocated to the new terminal 1033 may be arranged in the distributed manner.

Referring again to FIGS. 10A to 10B, the OAM entity 1010 may transmit the generated second resource allocation information to the hub 1020 (S1012). The hub 1020 may transmit third wireless signals to the terminals (e.g., the existing terminals 1031 and 1032 and the new terminal 1033) based on the second resource allocation information (S1013), and establish wireless links with the terminals (S1014). The hub 1020 may periodically transmit the wireless signals to the terminals through the wireless links, and periodically acquire channel quality information (e.g., XPI information, etc.) from the terminals.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first node belonging to an Xhaul network in a wireless backhaul system including the Xhaul network, the operation method comprising:
transmitting first resource allocation information to a second node and third nodes;
receiving, from the second node, information of cross polarization interferences (XPIs) measured for wireless signals through wireless links generated based on the first resource allocation information;
generating second resource allocation information indicating resources allocated to each of the second node and the third nodes based on the information of the XPIs; and
transmitting the second resource allocation information to the second node and the third nodes,
wherein the XPIs for the wireless signals are measured by the third nodes.

2. The operation method according to claim 1, wherein the second resource allocation information indicates time resources, frequency resources, and polarization resources having orthogonality and different polarization characteristics.

3. The operation method according to claim 1, wherein the first node is an operation administration and maintenance (OAM) entity of the wireless backhaul system, the second node is a hub of the wireless backhaul system, and the third nodes are terminals of the wireless backhaul system.

4. The operation method according to claim 1, wherein the generating of the second resource allocation information further comprises:
comparing the XPI measured by each of the third nodes with a preset threshold; and
allocating polarization resources to each of the third nodes based on a result of the comparison between the XPI measured by each of the third nodes and the preset threshold.

5. The operation method according to claim 4, wherein in the allocating of the polarization resources, when the XPI of one of the third nodes is less than or equal to the preset threshold, a dual polarization resource is allocated to the one of the third nodes.

6. The operation method according to claim 4, wherein in the allocating of the polarization resources, when the XPI of one of the third nodes is greater than the preset threshold, a single polarization resource is allocated to the one of the third nodes.

7. An operation method of a first node belonging to an Xhaul network in a wireless backhaul system including the Xhaul network, the operation method comprising:
receiving first resource allocation information from a second node;
transmitting first wireless signals to third nodes based on the first resource allocation information;
receiving information of cross polarization interferences (XPIs) measured for the first wireless signals from the third nodes;
transmitting the information of the XPIs to the second node;
obtaining, from the second node, second resource allocation information generated based on the XPIs;
transmitting second wireless signals to the third nodes based on the second resource allocation information; and
establishing wireless links with the third nodes.

8. The operation method according to claim 7, wherein the second resource allocation information indicates time resources, frequency resources, and polarization resources having orthogonality and different polarization characteristics.

9. The operation method according to claim 7, wherein the first node is a hub of the wireless backhaul system, the second node is an operation administration and maintenance (OAM) entity of the wireless backhaul system, and the third nodes are terminals of the wireless backhaul system.

10. The operation method according to claim 7, wherein each of the first wireless signals and the second wireless signals is a signal modulated in a multi-carrier modulation (MCM) scheme.

11. The operation method according to claim 7, wherein the first node includes antennas having different polarization characteristics, and in the transmitting of the second wireless signals, the second wireless signals are transmitted using at least one of the antennas based on the second resource information.

12. The operation method according to claim 11, wherein when the XPI of one of the third nodes is greater than a preset threshold, the second resource information indicates a single polarization resource for the one of the third nodes, and in the transmitting of the second wireless signals, the second wireless signals are transmitted based on the second resource information using one antenna having single polarization characteristics among the antennas.

13. The operation method according to claim 11, wherein when the XPI of one of the third nodes is less than or equal to a preset threshold, the second resource information indicates a dual polarization resource for the one of the third nodes, and in the transmitting of the second wireless signals, the second wireless signals are transmitted based on the second resource information using different antennas having different polarization characteristics among the antennas.

14. A first node belonging to an Xhaul network in a wireless backhaul system including the Xhaul network, the first node comprising a processor and a memory storing at least one instruction executable by the processor, wherein when executed by the processor, the at least one instruction causes the processor to:
receive first resource allocation information from a second node;
transmit first wireless signals to third nodes based on the first resource allocation information;
receive information of cross polarization interferences (XPIs) measured for the first wireless signals from the third nodes;

transmit the information of the XPIs to the second node:
obtain, from the second node, second resource allocation information generated based on the XPIs;
transmit second wireless signals to the third nodes based on the second resource allocation information; and
establish wireless links with the third nodes.

15. The first node according to claim 14, wherein the second resource allocation information indicates time resources, frequency resources, and polarization resources having orthogonality and different polarization characteristics.

16. The first node according to claim 14, wherein the first node and the third nodes are Xhaul device units (XDUs), and the second node is an operation administration and maintenance (OAM) entity of the wireless backhaul system.

17. The first node according to claim 14, wherein each of the first wireless signals and the second wireless signals is a signal modulated in a multi-carrier modulation (MCM) scheme.

18. The first node according to claim 14, wherein the first node includes antennas having different polarization characteristics, and in the transmitting of the second wireless signals, the second wireless signals are transmitted using at least one of the antennas based on the second resource information.

19. The first node according to claim 18, wherein when the XPI of one of the third nodes is greater than a preset threshold, the second resource information indicates a single polarization resource, and the at least one instruction further causes the processor to transmit the second wireless signals based on the second resource information using one antenna having single polarization characteristics among the antennas.

20. The first node according to claim 18, wherein when the XPI of one of the third nodes is less than or equal to a preset threshold, the second resource information indicates a dual polarization resource for the one of the third nodes, and the at least one instruction further causes the processor to transmit the second wireless signals based on the second resource information using different antennas having different polarization characteristics among the antennas.

* * * * *